United States Patent [19]
Steinman et al.

[11] Patent Number: 5,901,058
[45] Date of Patent: May 4, 1999

[54] SYSTEM AND METHODS FOR ACHIEVING HETEROGENEOUS DATA FLOW BETWEEN ALGORITHM BLOCKS IN A DISTRIBUTED CONTROL SYSTEM

[75] Inventors: Jethro F. Steinman, Havertown; M. Gulam Kanji, Allentown; Yahia C. Chehadeh, State College; Richard P. Himmer, Blue Bell; John J. Rosa-Bian, Ambler, all of Pa.

[73] Assignee: Honeywell Inc., Minneapolis, Minn.

[21] Appl. No.: 08/920,280

[22] Filed: Aug. 22, 1997

[51] Int. Cl.$^6$ ...................................................... G05B 15/00
[52] U.S. Cl. ............................................ 364/130; 364/184
[58] Field of Search ...................................... 364/130, 131, 364/140.02–140.04, 184–187, 468.01–468.05; 395/680, 683; 705/8; 707/10, 103, 104

[56] References Cited

U.S. PATENT DOCUMENTS 5,179,701   1/1993   Chisholm ................................. 707/104
5,345,586   9/1994   Hamala et al. ............................ 707/10
5,369,570   11/1994  Parad ......................................... 705/8

*Primary Examiner*—Paul P. Gordon
*Assistant Examiner*—Steven R. Garland
*Attorney, Agent, or Firm*—Hitt Chwang & Gaines

[57] ABSTRACT

A system for, and method of, achieving heterogeneous data flow between first and second algorithm blocks in a control system, and a distributed, real-time process control system employing the system or the method. In one embodiment, the system includes: (1) a passive connection, associated with a control module containing the second algorithm block, that provides for the communication of data from the first algorithm block to the second algorithm block without requiring the allocation of connector resources within the second algorithm block; and (2) an active connection, associated with the second algorithm block, that provides for the communication of data from the first algorithm block to the second algorithm block using dedicated connector resources within the second algorithm block, the control system thereby capable of providing data to the second algorithm block through both passive and active connections.

23 Claims, 3 Drawing Sheets

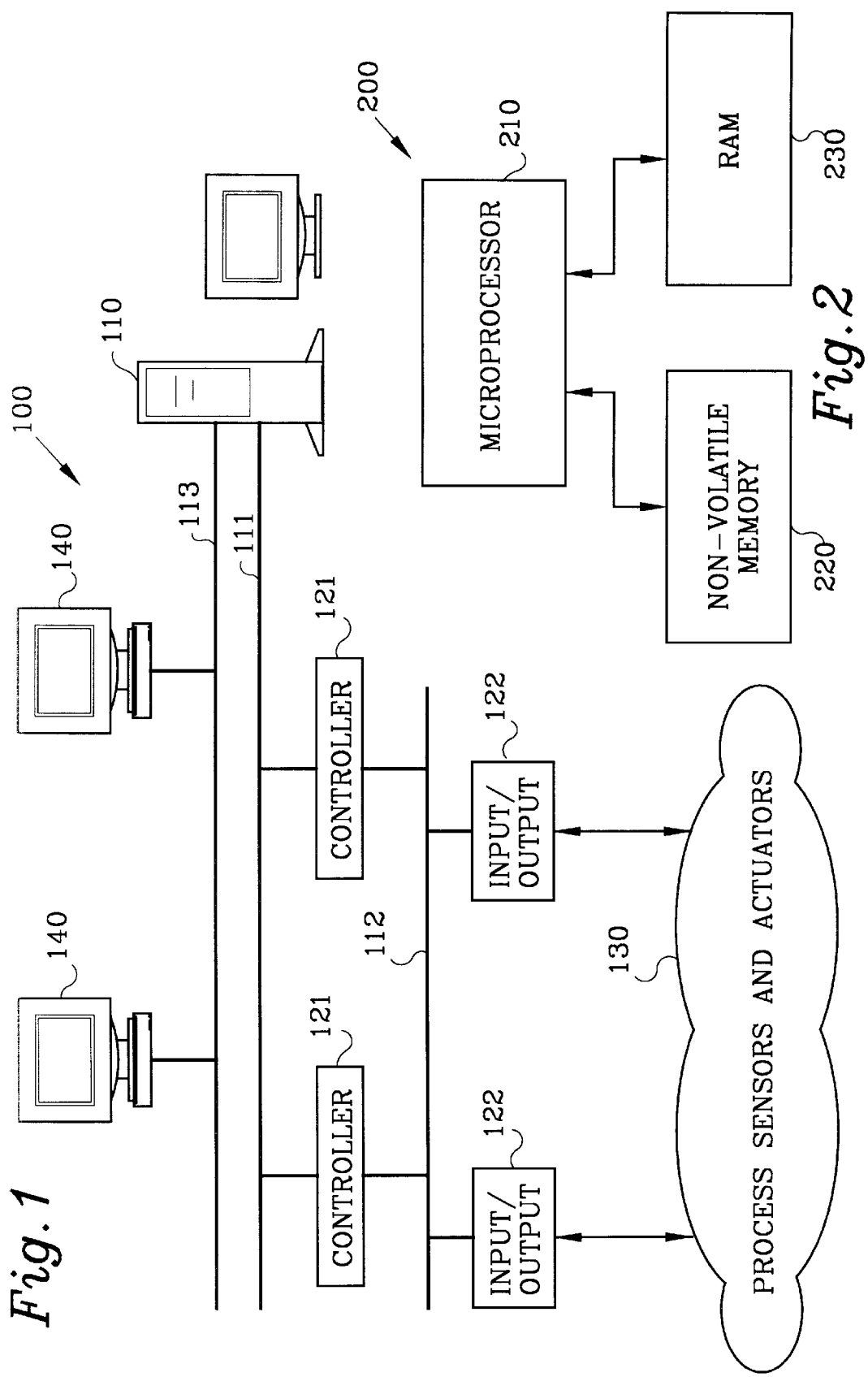

SYSTEM AND METHODS FOR ACHIEVING HETEROGENEOUS DATA FLOW BETWEEN ALGORITHM BLOCKS IN A DISTRIBUTED CONTROL SYSTEM

TECHNICAL FIELD OF THE INVENTION

The present invention is directed, in general, to computing and processing systems and, more specifically, to computing and processing systems that provide heterogeneous data flow connectivity between parameters of algorithm blocks in a distributed control system and methods of providing such connectivity.

BACKGROUND OF THE INVENTION

Automated plant control systems include a comprehensive set of algorithms, or software-definable process control routines, to control and monitor various processes within, for instance, a manufacturing facility. The control systems can be tailored to satisfy a wide range of process requirements globally or within specified portions of the facility. Conventionally, the control systems include a variety of modules, each having its own processor or firmware, linked together by communication buses to result in a distributed process control system. The distributed nature of the system affords high performance with the capability to expand the system incrementally to satisfy growth or modifications in the facility.

A first objective of automated plant management is to provide a process control scheme that synthesizes plant-wide control of all processes to thereby improve overall efficiency of the facility. Process control systems generally provide a means to create custom process control strategies, e.g., software-definable process control routines. In object-oriented programming environments, a complete control strategy may be built from smaller components called "blocks," "parameters," and "connections." A block is a software construct used to encapsulate the data and the algorithms of elemental control computations; parameters define the interface to individual pieces of data within the blocks; and connections allow data to flow between the parameters of blocks.

The basic function of a connection is to provide data flow between parameters of different blocks. Depending on design of a block algorithm, however, provision of simple continuity and data flow is not sufficient. Different block algorithms may require different elements of connection functionality. For example, although block algorithms generally have implicit knowledge about the type of passed data, some algorithms may require more than this implicit knowledge; some algorithms need explicit data type information to be provided by connection services.

In addition, some block algorithms may implement built in safety-handling, which requires knowledge of not only the value of passed data, but also status information that tells whether connection continuity has been maintained; in some cases, it is also necessary that status information distinguish different types of failures that can cause connectivity to be lost. Block algorithms which do not need explicit access to status or data type may still require predictable behavior of delivered data in the event that connection continuity is lost; such blocks need a useable "fail safe" value, which may be different for different data types, to be delivered.

Some block algorithms may require parameters that are connected in only a minority of process control strategies, or the blocks occasionally need connections, but they do not need explicit access to data type or status. In addition, some blocks may not be able allocate a dedicated resource for every parameter which may sometimes need a connection. The entire set of block algorithms must provide a user a configuration model in which parameters may be connected as needed by implementation-specific algorithms; a system for constructing process control schemes should allow the sharing of data between block algorithms in a manner which is convenient and which does not require the addition of blocks solely for the purpose of establishing a connection.

Therefore, what is needed in the art is a more powerful and flexible form of data access that achieves heterogeneous data flow connectivity between parameters of algorithm blocks in a distributed control system.

SUMMARY OF THE INVENTION

To address the above-discussed deficiencies of the prior art, it is a primary object of the present invention to provide a more flexible way of providing data flow for communication of parameters in a control system.

In the attainment of the above primary object, the present invention provides a system for, and method of, achieving heterogeneous data flow between first and second algorithm blocks in a control system, and a distributed, real-time process control system employing the system or the method. In one embodiment, the system includes: (1) a passive connection, associated with a control module containing the second algorithm block, that provides for the communication of data from the first algorithm block to the second algorithm block without requiring the allocation of connector resources within the second algorithm block or overt activity by the second algorithm block; and (2) an active connection, associated with the second algorithm block, that provides for the communication of data from the first algorithm block to the second algorithm block using dedicated connector resources and processing activity within the second algorithm block, the control system thereby capable of providing data to the second algorithm block through both passive and active connections.

As used herein, a "connection" means any software-definable routine, or routines, and associated data, operative to provide individually, or in combination, the functions described herein; an "active connection" provides data connectivity between algorithm blocks through active services of one of the two connected blocks and through reference data stored within that block; a "passive connection" provides data connectivity between two algorithm blocks without explicit action on the part of either connected block and without the use of reference data stored within either block. Passive connections are realized through data and services of a Control Module which encloses one or both algorithm blocks connected by the passive connection.

The present invention therefore introduces the broad concept of establishing multiple, i.e., "heterogeneous," connection types to reflect the fact that different algorithm blocks often require different levels of parameter access. Rather than provide a single, inflexible type of connection to handle all parameter communication, the present invention allows powerful, active connections to be established only when needed and more resource-efficient, passive connections to be established when active connections are not needed; both active and passive connections may be employed by a single algorithm block, whereby a control system may be optimized for both processing and resource efficiency.

In one embodiment of the present invention, the data communicated by a passive connection does not include the type of the data. Whereas an algorithm block may have implicit knowledge of the type of data being communicated, not communicating the data type explicitly reduces the amount of system resources dedicated to the communication of data between algorithm blocks. Similarly, in one embodiment, the data communicated by the passive connection does not include the status (e.g., the availability) of the passive connection. In a related embodiment, however, the control module provides a fail-safe value to the second algorithm block when the passive connection between the first and second algorithm blocks is lost (i.e., not available). Those skilled in the art are familiar with the importance of communicating fail-safe values in control systems. The present invention allows communication of fail-safe values even with passive connections.

In one embodiment, the data communicated by the active connection includes the type of the data. In a related embodiment, the data communicated by an active connection includes the status of the active connection. Providing algorithm blocks with the capability to communicate the data type or status of a connection requires the allocation of additional system resources, but allows more flexibility in the design of control processes employing such algorithm blocks.

In one embodiment, the control module containing the second algorithm block further contains the first algorithm block. A control system may employ many control modules having algorithm blocks associated therewith. The present invention allows for the communication of data from one algorithm block to a second algorithm block, using a passive or active connection, regardless of whether the first algorithm block is contained within the same control module as the second algorithm block.

In one embodiment of the present invention, the control system is a distributed, real-time process control system. Those skilled in the art will, however, perceive other uses for the present invention in control systems of all types.

The foregoing has outlined rather broadly the features and technical advantages of the present invention so that those skilled in the art may better understand the detailed description of the invention that follows. Additional features and advantages, that form the subject of the claims of the invention, will be described hereinafter. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which:

FIG. 1 illustrates a functional diagram of an exemplary distributed, real-time process control system with which the present invention may suitably be used;

FIG. 2 illustrates a high-level block diagram of an exemplary digital processing system that may be employed to execute software-definable process control routines embodying the principles of the present invention;

DETAILED DESCRIPTION

Figure 3:
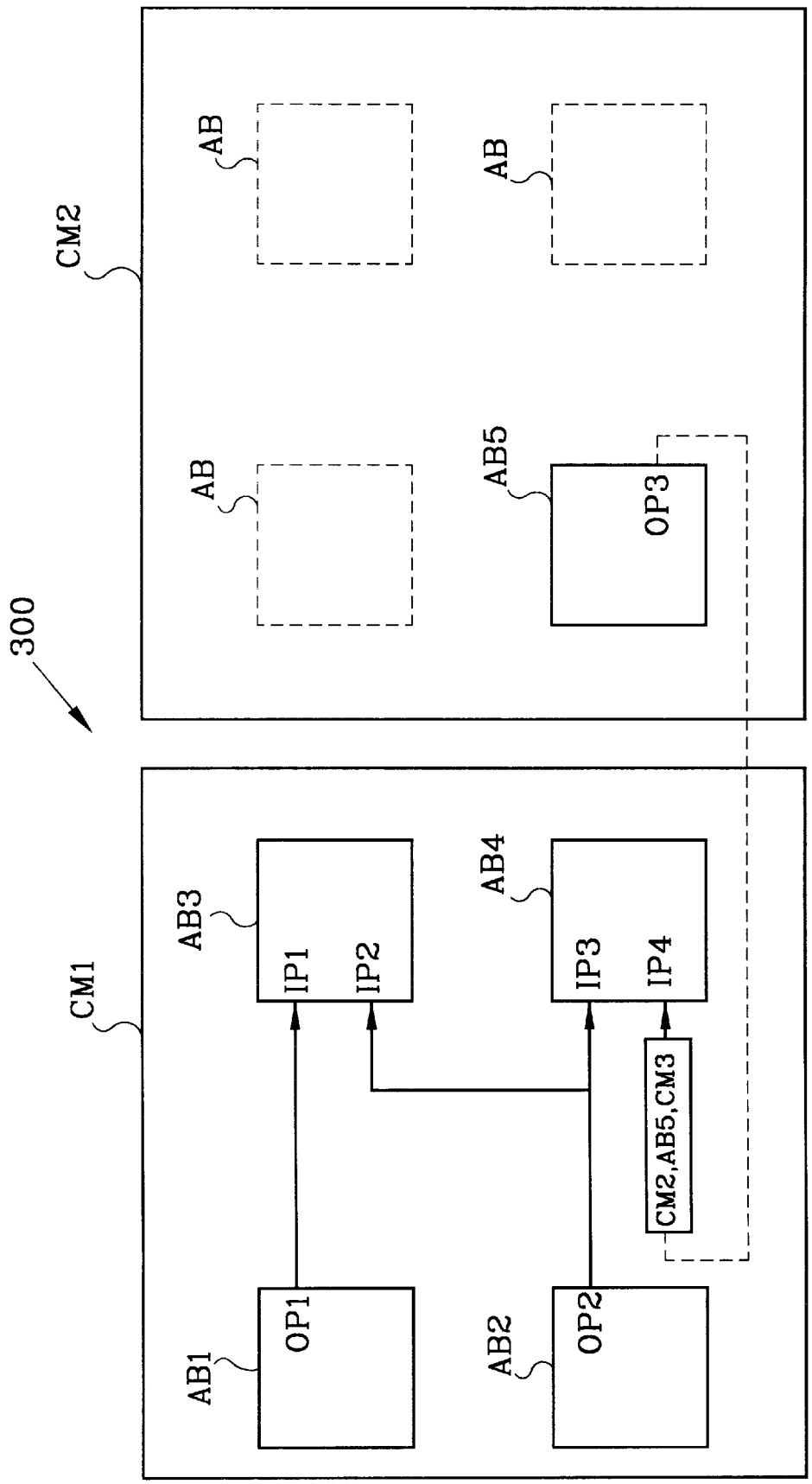
FIG. 3 illustrates an exemplary control strategy application employing the principles of the present invention.

Before undertaking a description of an exemplary embodiment of the systems and methods of the present invention, it will be helpful to describe a computing or processing system environment in which the present invention may suitably be used or implemented. Referring initially to FIG. 1, illustrated is a functional diagram of an exemplary distributed, real-time process control system (generally designated 100) with which the present invention may suitably be used.

Process control system 100 illustratively includes a computer network having a server 110 and a controller network 111. The controller network 111 provides an interface between the server 110 and process controllers (generally designated 121); the controller network 111 may, for example, carry supervisory messages between the server 110 and process controllers 121, and peer-to-peer messages between the process controllers 121. The process controllers 121 communicate with input/output ("I/O") devices 122 via an I/O network 112. The process controllers 121 are adapted to execute software-definable process control routines for controlling and receiving data from process sensors and actuators 130 via I/O devices 122 and I/O network 112. Those skilled in the art are familiar with various types of process sensors and actuators 130, such as electrically-controllable motors, valves, pumps, etc., that may be employed in the manufacture of sundry products; the principles of the present invention are not limited to a specific process or processing system, however, but may readily be employed to advantage in any such system.

In one embodiment, the process control system 100 further includes a local area network ("LAN") 113 that provides an interface between the server 110 and remote workstations (generally designated 140). The remote workstations 140 may be used by system operators to control and monitor the operation of the process control system 100. Although illustrated as a separate network, the LAN 112 and controller network 111 may be the same; i.e., the remote workstations 140 and the process controllers 120 may share the same network transmission medium. Those skilled in the art will recognize, however, that providing separate networks for control systems and operator workstations may enhance the reliability of a distributed, real-time process control system; e.g., network traffic on LAN 112 associated with distributing process-related data from server 110 to operator workstations 140 will not interfere with process control information transmitted between server 110 and remote process controllers 120 via control network 111.

Software-definable process control routines may be executed by any digital processing system, such as server 110, workstations 140, or process controllers 121. FIG. 2 illustrates a high-level block diagram of an exemplary digital processing system 200 that may be employed to execute software-definable process control routines embodying the principles of the present invention. Exemplary digital processing system 200 includes a microprocessor 210, non-volatile memory 220, and random access memory ("RAM") 230. Non-volatile memory 220, which is employed to store software-definable process control routines, may comprise, for example, a programmable read-only memory ("PROM"), flash ROM, or a magnetic storage medium. The software-definable process control routines stored in non-volatile memory 220 are executed by microprocessor 210. The microprocessor employs RAM 230 to store all or portions of the process control routines as the routines are executed, as well as storage for process control data associated with process sensors and actuators 130. The description of exemplary digital processing system 200 is merely illustrative; those skilled in the art will recognize that software-definable process control routines employing the principles of the present invention are not limited to a specific hardware implementation for digital processing system 200, and that all such systems are within the scope of the claims recited hereinafter.

The present invention discloses systems and methods for achieving "heterogeneous" data flow between algorithm blocks in a distributed control system; heterogenous data flow contemplates the availability of two classes of connection services, defined herein as "active" and "passive." Active connections are established through the use of active connectors, which are processing resources allocated by block designers as objects within a block. In addition to providing basic data flow, active connectors provide complete information on the data type of the referenced parameter and on the status of the maintained connection. Active connections are called "active" because they require active involvement from the block algorithm in order to function. They may also be called "inside" connections because they depend on resources allocated inside a block. Because they require dedicated resources, active connectors are preferably not allocated for every parameter supported by a block but, rather, are allocated for those parameters which are connected in most or all applications of a block. In contrast to active connections, passive connections allow parameters of algorithm blocks to have data flow connectivity without the provision of dedicated connector resources within an algorithm block.

Passive connections work for the majority of parameters since most parameters do not require dedicated connector resources. A passive connection provides data flow but does not provide the data type and status services of active connections. A passive connection may be established through the services of a special, encapsulating block called a "control module;" a control module serves as a container for both the algorithm blocks and the passive connections which connect the parameters of those blocks. Passive connections are called "passive" because they do not require active involvement from an algorithm block in order to function. A passive connection may also be called an "outside" connection since the resources used by the connection are allocated as part of a control module, outside of any algorithm blocks contained within the control module.

The principles of the present invention consist of a set of concepts and constructs, preferably implemented in software-definable process control routines, which may be understood through the use of two visualizations. One visualization, described with reference to FIG. 3, is a diagram showing the topological aspects of a control strategy that might be constructed by a process control engineer. A second visualization, described with reference to FIG. 4, employs a "class diagram" to illustrate the internal software design as it might be constructed by a system software designer.

Turning now to FIG. 3, illustrated is an exemplary control strategy 300 employing the principles of the present invention. The exemplary control strategy 300 includes control modules CM1 and CM2. Control module CM1 contains four algorithm blocks AB1, AB2, AB3, and AB4; control module CM2 contains algorithm block AB5. The principles of the present invention are not limited to any specific algorithms implemented by the algorithm blocks, or the number of control modules or algorithm blocks necessary for a specific process control strategy; for example, control module CM2 may include additional algorithm blocks (generally designated AB).

The algorithm blocks each define a number of parameters, which may be input parameters, output parameters, or both; in general, many or just a few parameters associated with an algorithm block might be exposed on the blocks when the process control strategy is created. Within control module CM1, algorithm blocks AB1 and AB2 have output parameters OP1 and OP2, respectively; algorithm block AB3 has input parameters IP1 and IP2, and algorithm block AB4 has input parameters IP3 and IP4. Within control module CM2, algorithm block AB5 has output parameter OP3.

Hereinafter, to make parameter designations unambiguous, parameter designations are preceded by block designators, which may be preceded by control module designators, as necessary, using a period (".") as a separator therebetween. For example, within the context of control module CM1, output parameter OP1 can be designated as AB1.OP1, while input parameter IP3 can be designated as AB4.IP3. Within the context of control module CM2, output parameter OP3 can be referred to unambiguously as AB5.OP3; outside the context of control module CM2, output parameter OP3 can be referred to as CM2.AB5.OP3.

The exemplary control strategy 300 depicts connections within control module CM1 as lines between output parameters and input parameters; the direction of data flow corresponds to the direction shown by the arrow. The connections within control module CM1 are AB1.OP1 to AB3.IP1, AB2.OP2 to AB3.IP2, and AB2.OP2 to AB4.IP3. Control module CM1 also contains a connection to a parameter outside its own context, i.e., the connection to parameter CM2.AB5.OP3. The connection to CM2.AB5.OP3 is denoted by a box attached to input parameter IP4 and is referred to as CM2.AB5.OP3 to CM1.AE4.IP4.

Of the input parameters depicted within the exemplary control strategy 300, it is assumed that one parameter, AB3.IP2, requires an active connection, and that the algorithm implementing algorithm block AB3 is such that the data type transported from AB2.OP2 to AB3.IP2 can not always be known implicitly. In addition, for purposes of illustration, it is assumed that the algorithm implemented in algorithm block AB3 employs special status detection and response in order to relieve the application engineer of the burden of implementing this function through the use of additional algorithm blocks; parameters AB3.IP1, AB4.IP3, and AB4.IP4 do not require special support and, thus, the connections which attach those input parameters to the respective output parameters are passive connections which function without explicit action on the part of algorithm blocks AB3 and AB4.

When the process control routine depicted by exemplary control strategy 300 is executed, the services provided by the invention cause data to flow across the connections. More specifically, the execution of control module CM1 causes each algorithm block to execute in turn according to an order designated by the application engineer, e.g., AB1, AB2, AB3, AB4. Thus, control module CM1 first causes algorithm block AB1 to execute and perform its processing, which results in a new value for output parameter OP1, and then causes algorithm block AB2 to execute and performs its processing, resulting in a new value for OP2.

Before the execution of algorithm block AB3, control module CM1 recognizes that the connection AB1.OP1 to AB3.IP1 is a passive connection and reads the value of AB1.OP1 and stores it to AB3.IP1. Control module CM1 next causes algorithm block AB3 to execute and performs its processing. Algorithm block AB3 recognizes that IP2 has an associated active connector and requires special processing; algorithm block AB3 calls on the services associated with the active connector for IP2, reading the data value, type and/or status. The algorithm implemented by algorithm block AB3 uses the value for IP1, provided through a passive connection, and the value, type and/or status for IP2, provided by an active connection, in executing its functions; i.e., algorithm block AB3 uses both "passive" and "active," or "heterogeneous," data.

Before the execution of algorithm block AB4, the control module CM1 recognizes that the parameters AB4.IP3 and AB4.IP4 are served by passive connections and, accordingly, reads the value of AB2.OP2 and stores it to AB4.IP3 and reads the value of CM2.AB5.OP3 and stores it to AB4.IP4. Control module CM1 then causes algorithm block AB4 to execute and perform its processing, during which it reads and uses the new values of IP3 and IP4 in executing its functions.

The actions described above for exemplary control strategy 300 occur repeatedly every time control module CM1 executes. Normally, connectivity is maintained and data is provided to blocks as needed. In the presence of abnormal conditions, however, connectivity may be lost. For example, circumstances could arise which make algorithm block AB2 unable to provide a useable value of output parameter OP2; if this occurred, however, algorithm block AB3 could discover this circumstance through a status value supplied by the active connector associated with input parameter IP2. In another scenario, connectivity to the value of output parameter OP3, which is coming from outside control module CM1, could be lost; in this case, algorithm block AB4 has no active connector from which to obtain status. In one embodiment of the present invention, however, algorithm block AB4 can execute under the assumption that when connectivity between OP3 and IP4 is lost, a useable "fail safe" value will be delivered to AB4.IP4 by control module CM1.

Figure 4:
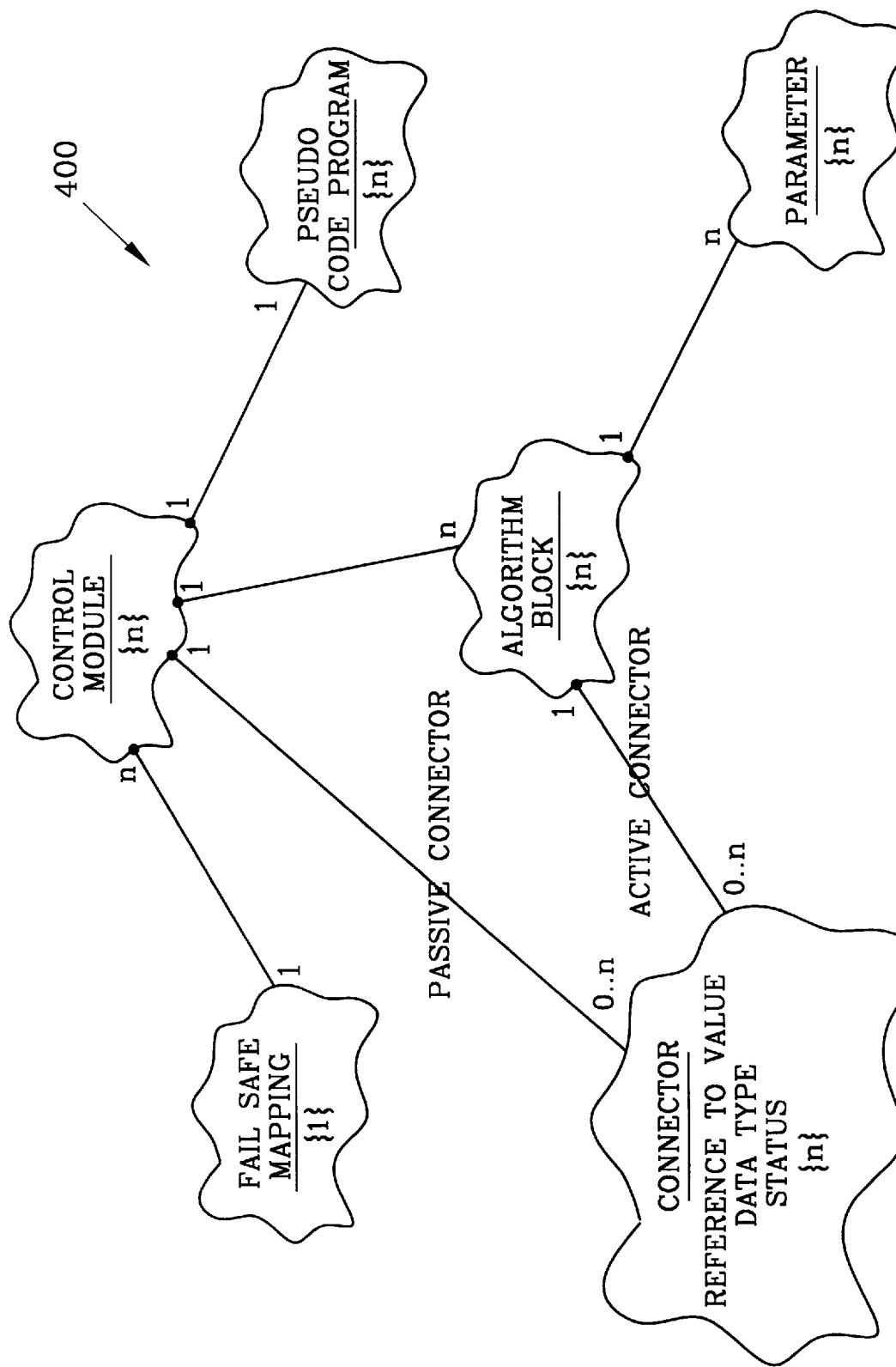
FIG. 4 illustrates a connections subsystem diagram for the exemplary control strategy application illustrated in FIG. 3.

Turning now to FIG. 4, illustrated is a connections subsystem diagram 400 for the exemplary control strategy application 300 illustrated in FIG. 3. The connections subsystem diagram 400 employs a "class diagram" to illustrate the internal software design as it might be constructed by a system software designer; those skilled in the art are familiar with the notation for class diagrams as described by Grady Booch in *Object Oriented Analysis and Design With Applications*, Benjamin/Cummings, 1994, which is incorporated herein by reference. The connections subsystem diagram 400 illustrates as a class diagram the behavior described above with reference to the exemplary control strategy 300 illustrated in FIG. 3, including the classes used within a software implementation of the invention. Table 1 describes the classes and their containment relationships with other classes, and also lists any instances which occur within the exemplary control strategy 300.

TABLE 1

| CLASS | DESCRIPTION | CONTAINS INSTANCES OF: | INSTANCES OF CLASS IN EXEMPLARY CONTROL STRATEGY 300 |
| --- | --- | --- | --- |
| Control Module | Implements the data and algorithms for the Control Module. These algorithms provide for the execution of algorithm blocks contained within the Control Module and for the execution of Passive Connections. A Control Module is the parent container for algorithm blocks; algorithm blocks can not exist without a parent container. | 1 Pseudo Code Program<br>N Algorithm Block<br>0 . . . N Connector<br>1 Fail Safe Mapping | CM1, CM2 |
| Pseudo Code | A list of binary codes that direct the execution sequence of a Control Module. These codes tell when it is time to execute an algorithm block or execute a passive connection. They are ordered to cause execution in the sequence specified by the application engineer. Passive connections are preferably executed just before the block which receives input data from the connection. | none | not explicitly visible in diagram 400 |
| Algorithm Block | Instances of this class form the elemental control algorithms from which larger control strategies are constructed. They depend upon a parent Control Module to stimulate their execution and, when active connections are not used, to provide data flow from output to input parameters. | 1 . . . N Parameter<br>0 . . . N Connector | AB1, AB2, AB3<br>AB4, AB5 |

TABLE 1-continued

| CLASS | DESCRIPTION | CONTAINS INSTANCES OF: | INSTANCES OF CLASS IN EXEMPLARY CONTROL STRATEGY 300 |
|---|---|---|---|
| Parameter | The fundamental datum within algorithm blocks. Parameters express the configuration data, the tuning data and the process data of the control algorithms. Transport of parameter values occurs through Active or Passive Connections. | none | OP1, OP2, OP3, IP1, IP2, IP3, IP4 |
| Connector | Instances of this class hold reference information that designates connected parameters as well as descriptive data such as data type and status. Active connections are implemented through a single instance of this class located within one of the two connected Algorithm Blocks. Passive Connections are implemented through two instances of this class located within the Control Module that holds the connected Algorithm Blocks. If connected Algorithm Blocks are contained by different Control Modules, then Passive Connections are are preferably implemented by two instances of this class, both located within the Control Module which holds the Algorithm Block with the connected input parameter. | 1 Data type<br>1 Reference To Value<br>1 Status | not explicitly visible in diagram 400 |
| Fail Safe Mapping | A lookup table which enables a Control Module to deduce an appropriate Fail Safe value from data type when continuity of a Passive Connection is broken. The Fail Safe value is passed to the parameter at the input end of the connection. In the diagram 400, it is shown that there is one Fail Safe Mapping for all Control Module instances. However, it is possible, and within the scope of the invention, that each Control Module could have its own Fail Safe Mapping and that the Fail-Safe Mapping could be assigned by user configuration. | none | not explicitly visible in diagram 400 |

Algorithm blocks which explicitly instantiate class Connector (such as algorithm block AB3) have Data Type available at configuration time and at execution time as needed for algorithm processing. For each parameter which needs a dedicated connection resource, an algorithm block instantiates one copy of Connector class as an active connector.

Status information is also available to algorithm blocks which instantiate class Connector. The Status value can be used for validity check at configuration time or as an execution time check to verify correct operation of the connection. The value can also be used in a binary sense to detect connection continuity or, in some cases, it can be used to garner information about the type of failure which occurred.

Connector instances used by algorithm blocks can be allocated at the time of implementation by a block designer, and may be allocated with a count which is fixed at implementation time or they may be allocated with a flexible count which is determined at the time of application configuration. In either case, however, a block designer should provide explicit program statements which use connector services to accomplish data flow, data type checking and status verification.

Algorithm blocks like AB4, which do not require active connections, are not required to instantiate class Connector to achieve connectivity for parameters; instead, algorithm blocks which require only passive connections can rely on the passive connections services of the Control Module class. In one embodiment, the Control Module class instantiates two passive connectors for every passive connection it supports; one passive connector serves as a reference to the output parameter and the other passive connector serves as a reference to the input parameter. While a passive connector defines what output parameter should be transferred to what input parameter, the Pseudo Code defines when transfers are to occur with respect to execution of each algorithm block.

Allocations of passive connectors and pseudo-code by a Control Module class are preferably flexible; i.e., nothing in the design of the algorithm blocks or of the control module should limit the number of passive connections which can be made to parameters of particular algorithm blocks at configuration time. Because of the passive connection services provided by a Control Module class, application designers are able to connect virtually any parameters of any algorithm block regardless of whether support of an active connector was anticipated by the block designer.

As part of its task of executing passive connections, instances of a Control Module monitor continuity of the connections; in the event of a failure, the Control Module identifies the type of the data flowing across the connection from its passive connector data, looks up the corresponding fail safe value within the Fail Safe Mapping class and passes the fail safe value to the input parameter. This design insures a minimum level of safety for algorithm blocks which do not use active connectors. The method by which the Fail Safe Mapping class assigns fail safe values to particular data types can vary depending upon the implementation chosen for the invention: for floating point data type conforming to the IEEE Floating Point standard, the natural fail safe value NAN (Not-a-Number) may be employed; for Boolean data types, "False" makes an acceptable fail safe value. Alternatively, fail safe values could be configurable by a system user. Those skilled in the art will readily perceive of other suitable criteria for selecting fail safe values appropriate for a specific application.

To further illustrate the invention, two sections of C-like Program Design Language ("PDL"), at a high level of abstraction, are provided in TABLES 2 and 3; the PDL in TABLE 2 corresponds to an exemplary execution algorithm for the Control Module class, and the PDL in TABLE 3 corresponds to the execution algorithm for an Algorithm Block class.

The PDL in TABLE 2 assumes that reference data contained in a Control Module's Connector instances have been pre-processed as part of the Control Module set up operation. After the pre-processing is complete, the Pseudo-Code has been converted from a general form to a specific form with fully bound memory references.

TABLE 2

```
pPseudoCodeInstruction = &FirstPseudoCodeInstruction;
while (pPseudoCodeInstruction <= &LastPseudoCodeInstruction) {
    switch ( *pPseudoCodeInstruction ) {
        case ExecuteInstruction:
            call execute function of component Algorithm Block;
            break;
        case TransferInstruction:
            read parameter source address out of
            *pPseudoCodeInstruction;
            if (parameter read incurred an error) {
                substitute fail safe value as source value
            }
            read parameter destination address out of
            *pseudoCodeInstruction;
            transfer the source value to the destination address;
            break;
        default: // EndInstruction
            exit from Control Module execution function;
    }
}
```

A process control strategy implementation generally requires many Algorithm Block classes, each with its own execution algorithm. The PDL in TABLE 3 assumes an Algorithm Block like AB3 which has an input parameter IP1 without an Active Connector, and an input parameter IP2 with an Active Connector. The Active Connector for input parameter IP2 is called "IP2Connector," and it is assumed that Connector instance IP2Connector has been pre-processed as part of the Algorithm Block set up operation. After pre-processing, IP2Connector holds a fully bound memory reference as well as data type and status information.

TABLE 3

```
IP2Status = status value read from IP2Connector;
if ( (IP2Status is bad) or (IP1 is at fail safe value) ) {
    perform appropriate failure processing;
}
else {
    IP2DataType = data type read from IP2Connector;
    pOutputParameter =
        parameter address value read from Active Connector for IP2;
    IP2 =
        value read from address pOutputParameter and cast to
        type DataType;
    do algorithm computation using values of IP2 and IP1.
}
```

From the foregoing, those skilled in the art will recognize that both active and passive connectivity may be provided in a process control system, whereby heterogeneous data flow may be provided between algorithm blocks. Having both kinds of connectivity allows designers of algorithm blocks to control the allocation of resources while at the same time getting all necessary functionality from block parameter connections. If a block under design needs explicit data type and status, they are available by allocating a dedicated resource within the block; if, on the other hand, this dedicated resource would be too expensive, in terms of available system resources, or if all incidents of parameter connectivity can not be anticipated, the passive form of connectivity is still available.

The active connections provided by the present invention provide some advantages over the prior art; for example, they make data type and status available during block execution. Implemented within an object oriented framework, however they also relieve a block designer of much of the programming burden required to achieve active connectivity. Furthermore, active connections allow the data type attribute to be accessed not only at execution time but also at configuration time, if that is useful within the algorithm implementation.

The passive connections provided by the present invention also provide some advantages over the prior art; for example, while providing basic data flow between connected output and input parameters, passive connections also provide definable fail safe behavior that may be keyed to data type. In addition, passive connections between boolean, integer and floating point data types can be supported. For each data type there can be provided a defined fail safe value appropriate to the data type; loss of continuity causes the fail safe value to be delivered to the connected input parameter.

From the above, it is apparent that the present invention provides a system for, and method of, achieving heterogeneous data flow between first and second algorithm blocks in a control system, and a distributed, real-time process control system employing the system or the method. Although the present invention and its advantages have been described in detail, those skilled in the art should understand that they can make various changes, substitutions and alterations herein without departing from the spirit and scope of the invention in its broadest form.

What is claimed is:

1. A system for achieving heterogeneous data flow between first and second algorithm blocks in a control system, comprising:

a passive connection, associated with a control module containing said second algorithm block, that provides for the communication of data from said first algorithm block to said second algorithm block without requiring the allocation of connector resources within said second algorithm block; and an active connection, associated with said second algorithm block, that provides for the communication of data from said first algorithm block to said second algorithm block using dedicated connector resources within said second algorithm block, said control system thereby capable of providing data to said second algorithm block through both said passive and said active connections.

2. The system as recited in claim 1 wherein said data communicated by said passive connection does not include the type of said data.

3. The system as recited in claim 1 wherein said data communicated by said passive connection does not include the status of said passive connection.

4. The system as recited in claim 1 wherein said data communicated by said active connection comprises a type of said data.

5. The system as recited in claim 1 wherein said data communicated by said active connection comprises the status of said active connection.

6. The system as recited in claim 1 wherein said control module provides a fail-safe value to said second algorithm block when said passive connection between said first and second algorithm blocks is lost.

7. The system as recited in claim 1 wherein said control module contains said first algorithm block.

8. A method for achieving heterogeneous data flow between first and second algorithm blocks in a control system, comprising the steps of:

establishing a passive connection between said first and second algorithm blocks for the communication of data from said first algorithm block to said second algorithm block, said passive connection not requiring the allocation of connector resources within said second algorithm block; and dedicating connector resources within said second algorithm block to provide an active connection for the communication of data from said first algorithm block to said second algorithm block, said control system thereby capable of providing data to said second algorithm block through both said passive and said active connections.

9. The method as recited in claim 8 wherein said data communicated by said passive connection does not include the type of said data.

10. The method as recited in claim 8 wherein said data communicated by said passive connection does not include the status of said passive connection.

11. The method as recited in claim 8 wherein said data communicated by said active connection comprises a type of said data.

12. The method as recited in claim 8 wherein said data communicated by said active connection comprises the status of said active connection.

13. The method as recited in claim 8 further comprising the step of providing a fail-safe value to said second algorithm block when said passive connection between said first and second algorithm blocks is lost.

14. The method as recited in claim 8 wherein said second algorithm block is contained in a control module, said control module performing said step of establishing.

15. The method as recited in claim 14 wherein said first algorithm block is contained in said control module.

16. The method as recited in claim 8 wherein said step of dedicating is performed by said second algorithm block.

17. A distributed, real-time process control system, comprising:

a plurality of sensors and controllable devices;

data processing and storage circuitry, associated with said plurality of sensors and controllable devices, operable to execute sequences of software instructions for achieving heterogeneous data flow between first and second algorithm blocks in said control system, comprising:

a passive connection, associated with a control module containing said second algorithm block, that provides for the communication of data from said first algorithm block to said second algorithm block without requiring the allocation of connector resources within said second algorithm block; and an active connection, associated with said second algorithm block, that provides for the communication of data from said first algorithm block to said second algorithm block using dedicated connector resources within said second algorithm block, said control system thereby capable of providing data to said second algorithm block through both said passive and said active connections.

18. The system as recited in claim 17 wherein said data communicated by said passive connection does not include the type of said data.

19. The system as recited in claim 17 wherein said data communicated by said passive connection does not include the status of said passive connection.

20. The system as recited in claim 17 wherein said data communicated by said active connection comprises a type of said data.

21. The system as recited in claim 17 wherein said data communicated by said active connection comprises the status of said active connection.

22. The system as recited in claim 17 wherein said control module provides a fail-safe value to said second algorithm block when said passive connection between said first and second algorithm blocks is lost.

23. The system as recited in claim 17 wherein said control module contains said first algorithm block.

* * * * *